(12) United States Patent
Poole et al.

(10) Patent No.: US 8,242,040 B2
(45) Date of Patent: Aug. 14, 2012

(54) PROCESS FOR THE REMOVAL OF CORROSION METALS FROM CARBONYLATION CATALYST SOLUTIONS

(75) Inventors: Andrew David Poole, East Riding of Yorkshire (GB); Stephen James Smith, East Yorkshire (GB)

(73) Assignee: BP Chemicals Limited, Middlesex (GB)

( * ) Notice: Subject to any disclaimer, the term of this patent is extended or adjusted under 35 U.S.C. 154(b) by 0 days.

(21) Appl. No.: 11/587,339

(22) PCT Filed: Mar. 31, 2005

(86) PCT No.: PCT/GB2005/001216
§ 371 (c)(1),
(2), (4) Date: Aug. 15, 2007

(87) PCT Pub. No.: WO2005/107945
PCT Pub. Date: Nov. 17, 2005

(65) Prior Publication Data
US 2007/0298960 A1    Dec. 27, 2007

(30) Foreign Application Priority Data
May 7, 2004 (GB) .................................. 0410289.3

(51) Int. Cl.
*B01J 37/30* (2006.01)

(52) U.S. Cl. ............... 502/12; 423/22; 423/54; 423/139
(58) Field of Classification Search ............ 502/112, 502/12; 423/22, 54, 139
See application file for complete search history.

(56) References Cited

U.S. PATENT DOCUMENTS

| | | | | |
|---|---|---|---|---|
| 4,007,130 A | * | 2/1977 | Leach et al. | 502/12 |
| 5,124,290 A | * | 6/1992 | Erpenbach et al. | 502/12 |
| 5,625,094 A | | 4/1997 | Nobel et al. | |
| 2005/0079122 A1 | * | 4/2005 | DiMascio | 423/477 |

FOREIGN PATENT DOCUMENTS

| | | |
|---|---|---|
| EP | 0 265 140 A1 | 4/1988 |
| EP | 0 538 040 A2 | 4/1993 |
| EP | 0 618 185 A1 | 10/1994 |
| GB | 2 298 200 A | 8/1996 |
| JP | 6-340574 | 12/1994 |
| RU | 2 091 365 C1 | 9/1997 |
| WO | WO 97/15544 | 5/1997 |

OTHER PUBLICATIONS

International Search Report dated Jun. 10, 2005; PCT International No. PCT/GB2005/001216.

* cited by examiner

*Primary Examiner* — Melvin C Mayes
*Assistant Examiner* — Melissa Stalder
(74) *Attorney, Agent, or Firm* — Nixon & Vanderhye

(57) ABSTRACT

A process for the removal of corrosion metal contaminants from a carbonylation catalyst solution comprising an iridium and/or rhodium carbonylation catalyst, an alkali and/or alkaline earth metal and corrosion metal contaminants in which the catalyst solution is contacted with a cation exchange resin having its active sites partially loaded with a sufficient amount of alkali and/or alkaline earth metal to maintain the concentration of said alkali and/or alkaline earth metal in the catalyst solution and recovering a catalyst solution of reduced corrosion metal contaminant content.

17 Claims, 2 Drawing Sheets

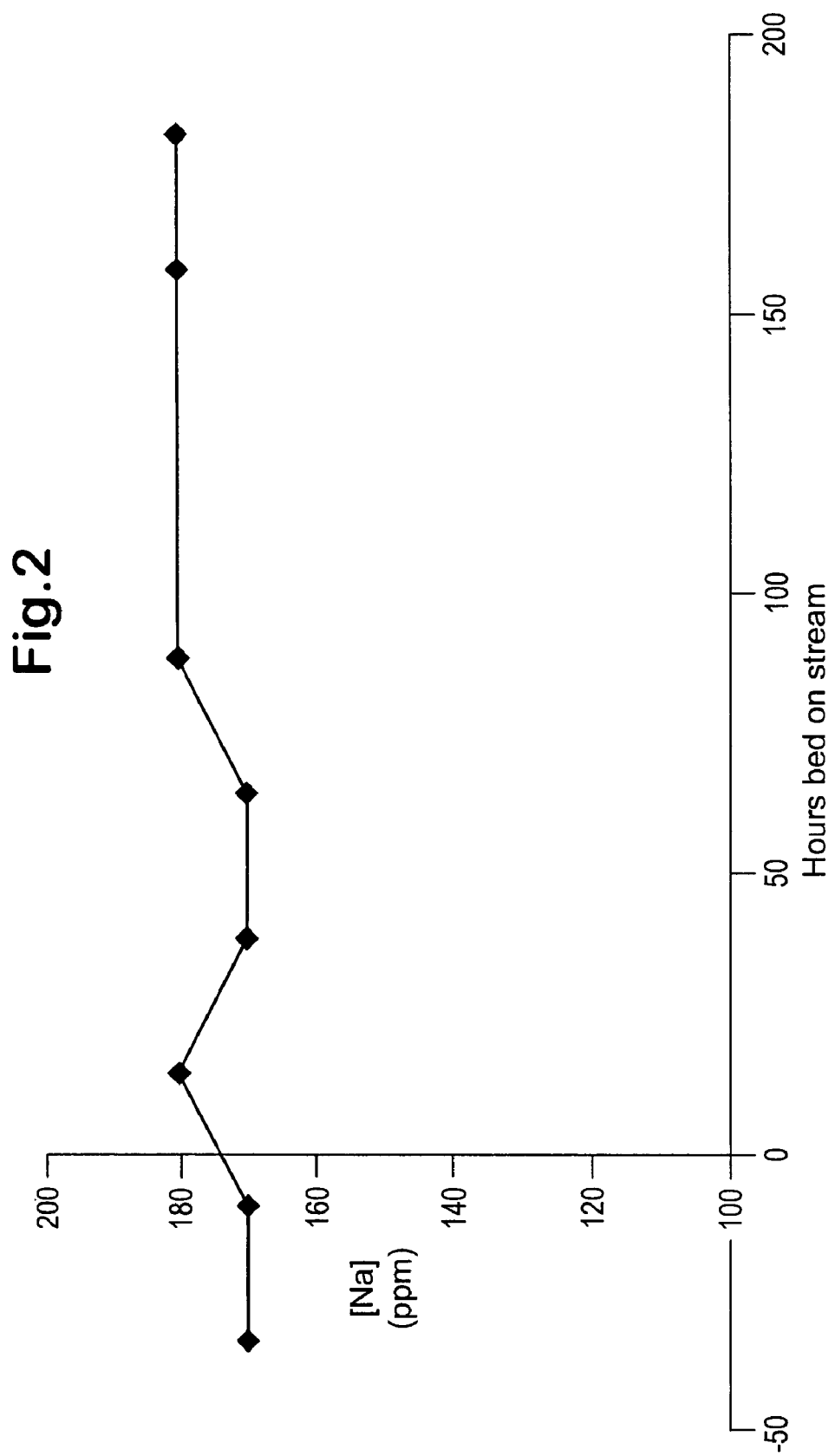

PROCESS FOR THE REMOVAL OF CORROSION METALS FROM CARBONYLATION CATALYST SOLUTIONS

This application is the U.S. National Phase of International Application PCT/GB2005/001216, filed 31 Mar. 2005, which designated the U.S. PCT/GB2005/001216 claims priority to British Application No. 0410289.3 filed 7 May 2004. The entire content of these applications are incorporated herein by reference.

The present invention relates to the removal of corrosion metal contaminants from carbonylation catalyst solutions comprising a carbonylation catalyst such as iridium, rhodium or mixtures thereof.

BACKGROUND OF THE INVENTION

The production of acetic acid by the carbonylation of methanol in the presence of an iridium catalyst and a promoter such as ruthenium is well known and is described, for example, in EP-A-0752406, EP-A-0849248, EP-A-0849249, and EP-A-1002785.

In operating carbonylation processes, such as the production of acetic acid, over extended periods of time, corrosion metal contaminants such as compounds of iron, nickel, molybdenum, chromium and the like form and build up in the carbonylation reaction composition. Such corrosion metal contaminants, if present in sufficient amounts may have an adverse effect on the carbonylation reaction.

U.S. Pat. No. 4,007,130 describes a process for regenerating a spent carbonylation catalyst solution comprising a rhodium or iridium catalyst by contacting it with a cation exchange resin in its hydrogen form.

European patent application, EP-A-0 265 140 describes contacting a catalyst solution comprising rhodium, lithium and corrosion metals with a cation exchange resin in its lithium form.

PCT patent application, WO 97/15544 describes a process for treating low water content carbonylation catalyst solutions which contain rhodium and an alkali metal to remove metallic corrosion products. The process comprises contacting the catalyst solution with an ion exchange resin and a sufficient amount of water to decrease the concentration of alkali metal ions to optimize removal of corrosion metal products.

Thus there remains the need for an improved process for removing corrosion metal contaminants from carbonylation catalyst solutions which comprise a carbonylation catalyst selected from iridium and/or rhodium, an alkali metal and/or alkaline earth metal and corrosion metals.

In a typical carbonylation process, such as in the manufacture of acetic acid or the manufacture of acetic anhydride, the carbonylation reaction composition from the reactor is passed to a flash zone for separation into a vapour fraction and a liquid fraction which comprises the majority of the catalyst components. This carbonylation catalyst solution is generally recycled back to the reactor. An iridium or an iridium/rhodium catalysed process is susceptible to small changes in alkali metal concentration and thus increases in the alkali metal concentration is likely to reduce the carbonylation rate and may cause a significant reduction in the rate. A rhodium catalysed process can tolerate greater concentrations of alkali metal however fluctuations in the alkali metal concentration will cause the carbonylation reaction rate to vary resulting in non-steady operation which is both undesirable and uneconomic. It has now been found that by partially loading a cation exchange resin with alkali/alkaline earth metal, the concentration of the alkali/alkaline earth metal in the carbonylation solution can be maintained thereby eliminating or at least mitigating the afore-mentioned disadvantages.

SUMMARY OF THE INVENTION

Accordingly, the present invention provides a process for the removal of corrosion metal contaminants from a carbonylation catalyst solution comprising a carbonylation catalyst selected from iridium, rhodium and mixtures thereof, an alkali and/or alkaline earth metal and corrosion metal contaminants which process comprises contacting said catalyst solution with a cation exchange resin having its active sites partially loaded with a sufficient amount of alkali and/or alkaline earth metal to maintain the concentration of said alkali and/or alkaline earth metal in the catalyst solution and recovering a catalyst solution of reduced corrosion metal contaminant content.

The process of the present invention is particularly applicable to the removal of corrosion metal contaminants from carbonylation catalyst solutions obtained from carbonylation processes employing in the carbonylation reaction composition either an iridium carbonylation catalyst, a rhodium carbonylation catalyst or a combination of iridium and rhodium carbonylation catalysts and also an alkali or alkaline earth metal salt capable of generating iodide ions in-situ.

Suitably, the carbonylation catalyst solution is derived from the liquid phase carbonylation of alcohols and/or reactive derivatives thereof, such as ethers, esters, halides or mixtures thereof to produce carboxylic acids, preferably, acetic acid in the presence of an iridium carbonylation catalyst, a rhodium carbonylation catalyst or a combination of iridium and rhodium carbonylation catalysts, an alkyl halide co-catalyst and an alkali metal or alkaline earth metal salt capable of generating iodide ions in-situ such as an alkali metal or alkaline earth metal iodide or an alkali metal or alkaline earth metal acetate. Where the catalyst employed is iridium, a catalyst promoter such as ruthenium, rhenium or osmium may also be present in the carbonylation reaction composition.

Alternatively, the carbonylation catalyst solution may be obtained from the liquid phase carbonylation of alcohols and/or reactive derivatives thereof in the presence of a rhodium catalyst and an alkali/alkaline earth metal salt capable of generating iodide ions in-situ under substantially anhydrous conditions to produce a carboxylic anhydride such as acetic anhydride or a mixture of a carboxylic anhydride and a carboxylic acid such as a mixture of acetic anhydride and acetic acid.

The carbonylation catalyst solution to be treated by the process of the present invention comprises an iridium carbonylation catalyst, a rhodium carbonylation catalyst or a mixture thereof. Suitable iridium carbonylation catalysts are described, for example in EP-A-0 643 034 and EP 0 752 406. Suitable rhodium carbonylation catalysts are described, for example, in EP-A-0 161 874 and U.S. Pat. No. 6,211,405.

Where the carbonylation catalyst solution treated in the process of the present invention comprises an iridium carbonylation catalyst, the catalyst solution may further comprise one or more catalyst promoters. Suitable promoters are selected from ruthenium, osmium and rhenium, and are more preferably selected from ruthenium and osmium. Ruthenium is the most preferred promoter. Examples of suitable promoters are described, for example, in EP-A-0 643 034 and EP 0 752 406.

The carbonylation reaction composition comprises a source of alkali metal and/or alkaline earth metal such as salts capable of generating iodide ions in-situ. Suitable salts include alkali metal or alkaline earth metal iodides and alkali metal or alkaline earth metal acetates. Suitably, the alkali metal salt is lithium iodide, lithium acetate, sodium iodide or sodium acetate. Suitable alkaline earth metal salts are the iodides or acetates of calcium or magnesium.

The carbonylation catalyst solution may also comprise unconverted carbonylation reactant, for example alcohols, ethers, halides or mixtures thereof. Suitably, the reactant may comprise $C_1$ to $C_{10}$ alcohols, such as methanol; dialkyl ethers wherein the alkyl groups independently have 1 to 10 carbon atoms, for example dimethyl ether; alkyl halides having 1 to 10 carbon atoms such as methyl iodide and esters of $C_1$ to $C_{10}$ alcohols with $C_2$ to $C_{11}$ carboxylic acids, for example, methyl acetate. For the production of carboxylic acids, water is required as co-reactant for ether or ester reactants. Preferably, methanol and/or methyl acetate are used as reactants.

The carbonylation catalyst solution treated in the process of the present invention may also comprise an alkyl halide co-catalyst such as methyl iodide.

Preferably, the concentration of the alkyl halide co-catalyst, such as methyl iodide, in the liquid carbonylation reaction composition is in the range 1 to 20% by weight, preferably 2 to 16% by weight.

In addition, the carbonylation catalyst solution may comprise a solvent compatible with the carbonylation process from which the catalyst solution is derived and which is also compatible with the cation exchange resin. For example, where the carboxylic acid to be produced is acetic acid the solvent may be acetic acid.

Where the catalyst solution is derived from a carbonylation process for the production of carboxylic acids, such as acetic acid, the catalyst solution may also comprise water. Water may be formed in situ in the carbonylation reaction composition, for example, by the esterification reaction between methanol reactant and acetic acid product. To maximise catalyst system stability during the acetic acid product recovery, the concentration of water in process streams containing catalyst system for recycle to the carbonylation reaction zones is preferably maintained at a concentration of at least 0.5% by weight.

The carboxylic acid may comprise a carboxylic acid having 1 to 10 carbon atoms and is preferably acetic acid.

Typically, carbonylation processes operate at 100-300° C. and at elevated pressure (15 to 200 barg) with a partial pressure of carbon monoxide of 2-30 atmospheres and may be carried out in one or more reaction zones.

The process of the present invention is particularly applicable to the removal of corrosion metal contaminants from a carbonylation catalyst solution comprising an iridium carbonylation catalyst, methyl iodide co-catalyst, water, acetic acid, methyl acetate, at least one promoter selected from ruthenium, osmium and rhenium and an alkali and/or alkaline earth metal.

The cation exchange resins suitable for use in the process of the present invention may be either of the strong-acid or the weak-acid type in the alkali or alkaline earth metal form. Any alkali metal or alkaline earth metal cation is acceptable provided the corresponding alkali metal or alkaline earth metal cation is employed in the alkali metal or alkaline earth metal salt capable of generating iodide ions. Suitably, a cation exchange resin in its lithium, sodium, calcium or magnesium form is employed.

Both strong-acid and weak-acid type resins are available commercially.

Suitably, the strong-acid type resin may be a sulphonated styrene-divinylbenzene copolymer or a phenol-formaldehyde condensation polymer. The weak-acid type resin may be a copolymer of acrylic or methacrylic acid or esters or the corresponding nitriles or a phenolic resin. Preferably, the cation exchange resin for use in the present invention is a strong-acid type resin.

The resin may be either a macroreticular type resin or a gel-type resin. The cation exchange resin may be converted to its alkali/alkaline earth metal form by contacting the resin with a solution of an alkali/alkaline earth metal salt, such as a solution of alkali metal acetate or iodide, for example lithium or sodium acetate or lithium or sodium iodide or a solution of the iodides or acetates of an alkaline earth metal such as the acetates or iodides of magnesium or calcium. Suitable procedures are well known in the art. The amount of alkali metal or alkaline earth metal salt added to the resin should be such that the loaded resin has greater than 0 but less than 100% of its active sites loaded with the alkali metal and/or alkaline earth metal. For any given resin the exact degree of loading onto the resin required to maintain the concentration of alkali/alkaline earth metal in the catalyst solution will depend on the amount of alkali/alkaline earth metal employed in the carbonylation reaction solution, the specific alkali metal or alkaline earth metal to be loaded onto the resin because different metals will have a different degree of affinity for a resin, the flowrate through the resin bed and the operating temperature of the resin bed. Typically, for an iridium catalysed process wherein the concentration of lithium ions in the reactor carbonylation solution is >0 to 150 ppm and where the resin is to be in its lithium form, the resin suitably has >0 to 60% of its active sites loaded with lithium ions, such as 30 to 55% of its active sites. For an iridium catalysed process wherein the concentration of sodium ions in the reactor carbonylation solution is >0 to 500 ppm and where the resin is to be in its sodium form, the resin suitably has >0 to 60% of its active sites loaded with sodium ions, such as 30 to 55% of its active sites.

The contacting of the cation exchange resin in its alkali metal or alkaline earth metal form with the carbonylation catalyst solution may be carried out using any suitable conventional procedure and equipment. Typically, the carbonylation catalyst solution is passed through a fixed-bed of the resin.

The rate of flow of the catalyst solution through the fixed-bed of resin during the corrosion metal removal process will, in general, be that recommended by the resin manufacturer and may typically be up to about 20 bed volumes per hour.

The contacting of the carbonylation catalyst solution with the cation exchange resin in its alkali/alkaline earth metal form may be carried out at any suitable temperature above the freezing point of the catalyst solution and below the temperature at which the resin and/or the catalyst solution exhibits undesirable decomposition. If temperatures above the boiling point of the catalyst solution are employed, then the contacting should be carried out under pressure to maintain the catalyst solution in the liquid phase. Suitably, the contacting temperature may be in the range 0° to 110° C. such as 10° to 100° C. However, pressure is not a critical variable. Generally, the contacting operation may be carried out at atmospheric pressure or a pressure slightly above atmospheric but superatmospheric or sub-atmospheric pressures may be employed if desired.

When the cation exchange resin in its alkali metal or alkaline earth metal form has reached its capacity for corrosion metal contaminants it may firstly be rinsed with a liquid compatible with carbonylation processes, for example, carboxylic acid to remove residual carbonylation catalyst solution and then regenerated. The cation exchange resin may be regenerated by the methods recommended by the manufacturers to displace the retained corrosion metal contaminants.

Suitably, a solution of carboxylic acid, such as acetic acid and alkali metal or alkaline earth metal acetate, such as lithium acetate, sodium acetate or magnesium acetate may be used to regenerate the resin.

The corrosion metal contaminant removal process of the present invention may be operated as a batch or as a continuous process, preferably, as a continuous process. Optionally, more than one resin bed is provided so that whilst the carbonylation catalyst solution is being passed through one resin bed, one or more other resin beds are being regenerated.

The process of the present invention is particularly applicable to the removal of corrosion metal contaminants such as iron, nickel, chromium, manganese and molybdenum, preferably, iron and nickel. Each corrosion metal contaminant may be present in the carbonylation reaction composition in an amount up to its limit of solubility. Typically, this may be up to 10,000 ppm by weight of metal. The amount of each corrosion metal removed from the catalyst solution will depend upon the initial concentration of the corrosion metal, the degree of alkali metal or alkaline earth metal loading on the resin, the capacity of the resin, and operating conditions such as flow rate of the catalyst solution, reactor composition and temperature of the resin bed.

A liquid-phase carbonylation reaction is generally carried out in one or more reaction zones. Where the carbonylation reaction is the carbonylation of methanol and/or a reactive derivative thereof and is carried out in the presence of an iridium and/or rhodium carbonylation catalyst, an alkali metal salt capable of generating iodide ions, methyl iodide co-catalyst and optionally a promoter, and a finite concentration of water, the product will be acetic acid. The crude acetic acid product may be recovered from a reaction zone by flash separation. In flash separation the carbonylation reaction composition is passed to a flashing zone via a flashing valve. The flash separation zone may be an adiabatic flash vessel or may have additional heating means. In the flash separation zone a liquid fraction, the carbonylation catalyst solution, comprising the majority of the catalyst and, if employed, the majority of the promoter, is separated from a vapour fraction comprising acetic acid, carbonylatable reactant, water and methyl iodide co-catalyst and non-condensable gases such as nitrogen, carbon monoxide, hydrogen and carbon dioxide; at least a portion of the carbonylation catalyst solution is recycled to the reaction zone and the vapour fraction is passed to one or more purification stages as desired to recover acetic acid product.

By treating all or part of the carbonylation catalyst solution by the process of the present invention, the build-up of corrosion metal contaminants in the carbonylation reaction composition can be reduced. Preferably, a slipstream of catalyst solution is removed from the flash separation zone and treated according to the process of the present invention to remove corrosion metal contaminants and provide a catalyst solution having reduced corrosion metal contaminants which is recycled to the carbonylation reactor.

BRIEF DESCRIPTION OF THE DRAWINGS

The invention will now be further described with reference to the accompanying drawings, in which:

FIG. 2 is a plot of sodium concentration versus Hours bed on stream.

EXAMPLES

Figure 1:
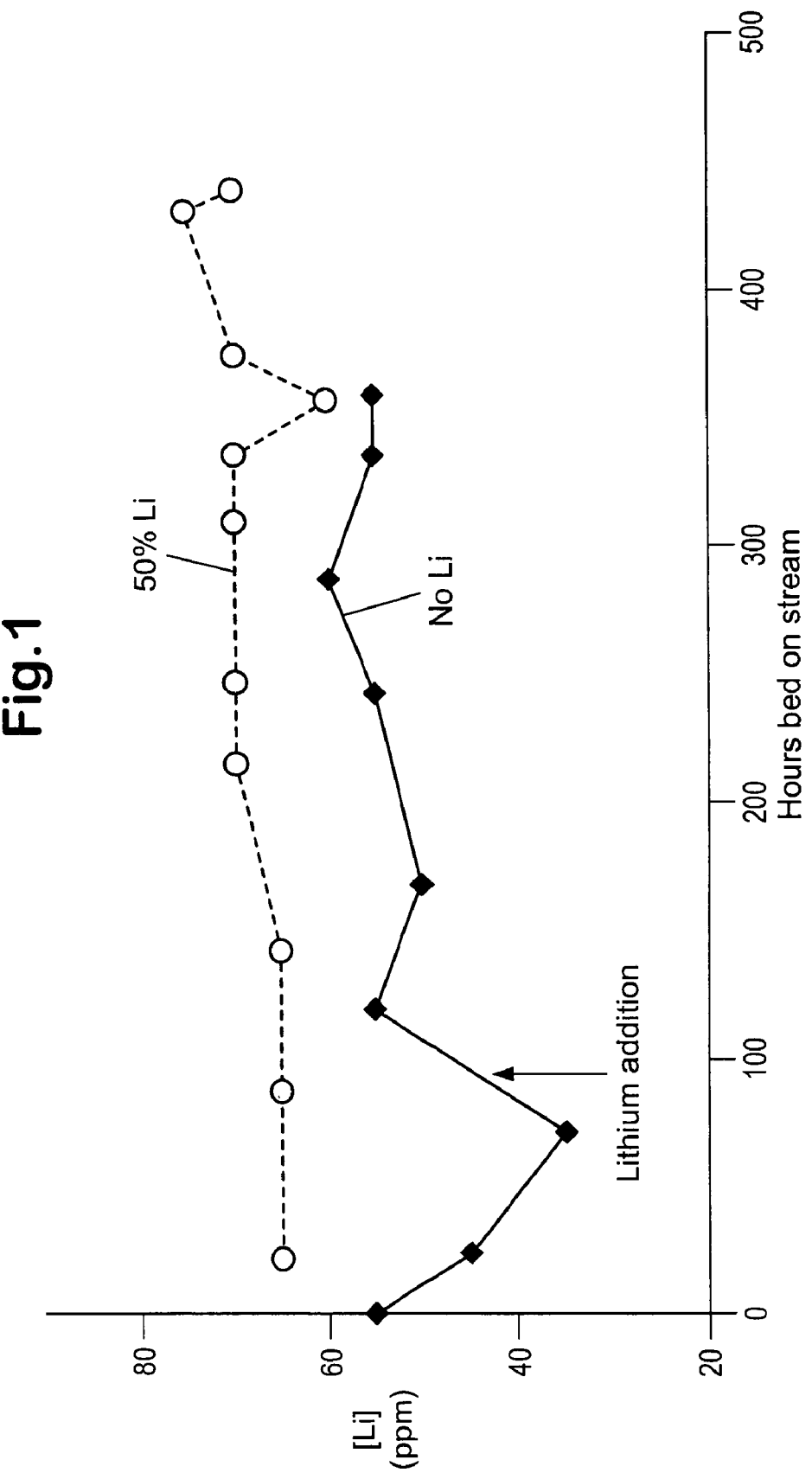
FIG. 1 are plots of lithium concentration versus Hours bed on stream.

The present invention will now be illustrated by way of example only and with reference to the following Examples.

Preparation Method 1: Loading of Resin with Lithium

Lithium acetate solution (prepared by adding 460 g $LiOAc.2H_2O$ to 2.5 kg (95/5 wt % acetic acid/water solution) was passed through a bed containing 500 ml of pre-soaked Amberlyst 15 at a liquid hour space velocity (LHSV) of $4\,h^{-1}$. The resin was then washed with water and oven-dried at 100° C. for 24 hours. The loaded resin contained 2.6 wt % Li. Resins loaded with 0%, 25%, 50%, 75% and 100% lithium were prepared by mixing together appropriate amounts of the 2.6 wt % lithium loaded resin with unloaded Amberlyst 15.

Loading of Resin with Magnesium

Preparation method 1 was repeated except that a magnesium acetate solution (480 g $Mg(OAc)_2$ in 2.7 kg 95/5 wt % acetic acid/water solution) was used to load the resin. The loaded resin contained 4.4 wt % Mg. Resins loaded with 0%, 25%, 50%, 75% and 100% magnesium were prepared by mixing together appropriate amounts of the 4.4 wt % magnesium loaded resin with unloaded Amberlyst 15.

Examples 1 to 5

A carbonylation solution was prepared by mixing 17.2 kg acetic acid, 1.0 kg water, 1.6 kg methyl acetate, 200 g iodomethane, 1.9 g iron acetate, 2.6 g nickel acetate and 11.1 g lithium acetate. The solution was pumped at $1.0\,l.h^{-1}$ through a bed containing 100 ml of resin. Samples were taken after 2, 4, 6, 8 and 10 bed volumes of feed had passed through the bed and analysed for Li, Fe and Ni content. The initial concentration of Li and the corrosion metals and the results of the Examples are given in Table 1.

Examples 6 to 10

The procedure of Examples 1 to 5 was repeated except that in the preparation of the carbonylation solution 23.0 g of magnesium acetate was used instead of lithium acetate. The initial metal concentrations and results of the Examples are given in Table 2.

TABLE 1

|  |  | Example | | | | | | | | | | | | | | |
|---|---|---|---|---|---|---|---|---|---|---|---|---|---|---|---|---|
|  |  | 1 | | | 2 | | | 3 | | | 4 | | | 5 | | |
| Loading (%) |  | 0 | | | 25 | | | 50 | | | 75 | | | 100 | | |
| Analysis (ppm) |  | Li | Fe | Ni | Li | Fe | Ni | Li | Fe | Ni | Li | Fe | Ni | Li | Fe | Ni |
| Feed (ppm) |  | 65 | 26 | 24 | 75 | 16 | 20 | 75 | 26 | 30 | 75 | 24 | 28 | 75 | 24 | 28 |
| Bed Volumes | 2 | 0 | 0 | 0 | 5 | 0 | 0 | 4 | 0 | 0 | 5 | 0 | 0 | 45 | 6 | 0 |
|  | 4 | 0 | 0 | 0 | 1 | 0 | 0 | 1 | 0 | 0 | 2 | 0 | 0 | 65 | 18 | 0 |
|  | 6 | 0 | 0 | 0 | 0 | 0 | 0 | 0 | 0 | 0 | 2 | 2 | 0 | 65 | 6 | 0 |
|  | 8 | 0 | 0 | 0 | 0 | 0 | 0 | 0 | 0 | 0 | 5 | 8 | 0 | 75 | 14 | 0 |
|  | 10 | 0 | 0 | 0 | 0 | 0 | 0 | 0 | 0 | 0 | 10 | 14 | 0 | 80 | 8 | 0 |

TABLE 2

| | | Example | | | | | | | | | | | | | |
|---|---|---|---|---|---|---|---|---|---|---|---|---|---|---|---|
| | | 6 | | | 7 | | | 8 | | | 9 | | | 10 | | |
| Loading (%) | | 0 | | | 25 | | | 50 | | | 75 | | | 100 | | |
| Analysis (ppm) | | Mg | Fe | Ni | Mg | Fe | Ni | Mg | Fe | Ni | Mg | Fe | Ni | Mg | Fe | Ni |
| Feed (ppm) | | 220 | 27 | 29 | 220 | 27 | 29 | 220 | 27 | 28 | 220 | 28 | 28 | 200 | 24 | 23 |
| Bed Volumes | 2 | 0 | 0 | 0 | 0 | 0 | 0 | 15 | 4 | 2 | 50 | 15 | 9 | 200 | 24 | 13 |
| | 4 | 0 | 0 | 0 | 10 | 6 | 4 | 25 | 8 | 5 | 125 | 20 | 15 | 180 | 26 | 19 |
| | 6 | 0 | 0 | 0 | 30 | 8 | 7 | 30 | 9 | 7 | 130 | 22 | 18 | 210 | 26 | 23 |
| | 8 | 0 | 0 | 0 | 40 | 10 | 8 | 50 | 14 | 10 | 160 | 23 | 20 | 220 | 28 | 23 |
| | 10 | 0 | 0 | 0 | 50 | 13 | 11 | 55 | 15 | 14 | 160 | 24 | 21 | 220 | 29 | 25 |

The results in Tables 1 and 2 show that where the resin is unloaded all the alkali and alkaline earth metal is removed. Where the resin has 100% of its active sites loaded with the alkali/alkaline earth metal, there is significant elution of the metal from the resin into the solution thereby increasing the concentration of alkali/alkaline earth metal. However, operation with a partially loaded resin achieves significant corrosion metal removal whilst substantially maintaining the alkali/alkaline metal concentration in the carbonylation solution.

Examples 11 and 12

In Example 12 a cation exchange resin having 50% of its active sites loaded with lithium was prepared according to Preparation Method 1 above. In comparison Example 11 the same type of resin was used but with no lithium loading (that is in its proton form). A catalyst solution obtained from the flash zone of an acetic acid reaction system comprising acetic acid, iridium, methyl iodide, methyl acetate, lithium, corrosion metals and water was passed through a 30 ml volume of each resin bed at a flow rate of 300 ml h$^{-1}$. The effect of the resin beds on the lithium concentration in the reactor are shown in FIG. 1. FIG. 1 clearly shows that for the comparison resin (Ex. 11) the concentration of lithium in the reactor became significantly depleted after 100 hours and lithium had to be added. In contrast, use of the partially loaded resin resulted in virtually no net change in the reactor lithium concentration.

Example 13

A 50:50 mixture of Amberjet 1500 and Amberjet 1200Na (both strong acid gel type resins commercially available from Rohm & Haas; Amberjet 1200Na having sodium on the active sites) was prepared. A catalyst solution obtained from the flash zone of an acetic acid reaction system comprising acetic acid, iridium, methyl iodide, methyl acetate, sodium, corrosion metals and water was passed through a 30 ml volume of the resin bed at a flow rate of 300 ml h$^{-1}$. At 30 hours and 10 hours prior to the start of the experiment samples of catalyst solution were taken and analysed to ensure a steady concentration of sodium. FIG. 2 illustrates that a cation exchange resin partially loaded with sodium does not significantly alter the sodium concentration in the reactor.

The invention claimed is:

1. A process for the liquid phase carbonylation of a carbonylatable reactant selected from the group consisting of methanol and reactive derivatives thereof to produce a carbonylatable product selected from the group consisting of acetic acid, acetic anhydride and mixtures thereof, which process comprises contacting, in a reaction zone, the carbonylatable reactant with carbon monoxide in a liquid reaction composition, said liquid reaction composition comprising a carbonylation catalyst selected from the group consisting of iridium, rhodium and mixtures thereof; methyl iodide, an alkali metal or alkaline earth metal salt capable of generating iodide ions and corrosion metal contaminants, in which process the liquid reaction composition is separated in a flash separation zone to obtain a vapor fraction comprising the carbonylatable product and a liquid fraction comprising a carbonylation catalyst solution wherein said carbonylation catalyst solution comprises the carbonylation catalyst, the alkali or alkaline earth metal and the corrosion metal contaminants and wherein at least a portion of the carbonylation catalyst solution is recycled to the reaction zone, wherein the carbonylation catalyst solution recycled to the reaction zone has a reduced corrosion metal contaminant content and the concentration of alkali metal or alkaline earth metal in the liquid reaction composition is controlled by contacting at least a portion of the carbonylation catalyst solution with a cation exchange resin having its active sites partially loaded with a sufficient amount of lithium or sodium, wherein the lithium or sodium loading on the resin is >0 to 60% of the resin active sites.

2. A process according to claim 1 wherein the catalyst is iridium.

3. A process according to claim 1 wherein the cation exchange resin is a strong acid type resin.

4. A process according to claim 3 wherein the strong acid type resin is a sulphonated styrene divinyl benzene copolymer or a phenol-formaldehyde condensation polymer.

5. A process according to claim 1 wherein the cation exchange resin is a macroreticular resin or a gel resin.

6. A process according to claim 1 wherein the lithium or sodium loading is 30 to 55% of the active sites.

7. A process according to claim 1 wherein the catalyst comprises iridium, the resin has >0 to 60% of its active sites loaded with lithium and the lithium concentration in the carbonylation solution is >0 to 150 ppm.

8. A process according to claim 1 wherein the catalyst comprises iridium, the resin has >0 to 60% of its active sites loaded with sodium and the sodium concentration in the carbonylation solution is >0 to 500 ppm.

9. A process according to claim 1 wherein the carbonylation catalyst solution is obtained from the liquid phase carbonylation of methanol and/or methyl acetate.

10. A process according to claim 9 wherein the liquid phase carbonylation is carried out under hydrous or substantially anhydrous conditions.

11. A process according to claim 1 wherein the carbonylation catalyst solution is obtained from a process to produce acetic acid and/or acetic anhydride in the presence of a rhodium catalyst and an alkali or alkaline earth metal salt capable of generating iodide ions.

12. A process according to claim 1 wherein the carbonylation catalyst solution is obtained from a process to produce acetic acid in the presence of an iridium catalyst and an alkali or alkaline earth metal salt capable of generating iodide ions.

13. A process according to claim 12 wherein the catalyst solution also comprises a catalyst promoter.

14. A process according to claim 13 wherein the promoter is selected from the group consisting of ruthenium, osmium and rhenium.

15. A process according to claim 1 wherein the carbonylation catalyst solution comprises an iridium carbonylation catalyst, methyl iodide, water, acetic acid, methyl acetate, at least one promoter selected from the group consisting of ruthenium, rhenium and osmium, and an alkali metal and/or alkaline earth metal.

16. A process according to claim 1 wherein the corrosion metal contaminants are selected from the group consisting of iron, nickel, chromium, manganese and molybdenum.

17. A process according to claim 1 which is operated as a continuous process.

* * * * *